(12) United States Patent
Umezawa et al.

(10) Patent No.: US 6,422,590 B1
(45) Date of Patent: Jul. 23, 2002

(54) HOLDER FOR MOUNTING AN AIR BAG MODULE

(75) Inventors: Fumio Umezawa, Tochigi-ken; Tatsuya Terauchi, Saitama; Makoto Kurita, Saitama; Naohiro Takahashi, Saitama; Hiroyuki Ito, Saitama, all of (JP)

(73) Assignees: TS Tech Co., Ltd.; Honda Giken Kogyo Kabushiki Kaisha, both of (JP)

( * ) Notice: Subject to any disclaimer, the term of this patent is extended or adjusted under 35 U.S.C. 154(b) by 0 days.

(21) Appl. No.: 09/940,275

(22) Filed: Aug. 28, 2001

(30) Foreign Application Priority Data

Aug. 30, 2000 (JP) ........................................ 2000-260786

(51) Int. Cl.[7] ............................................... B60R 21/16
(52) U.S. Cl. .................................. 280/728.2; 280/730.2
(58) Field of Search .......................... 280/728.2, 728.3, 280/730.1, 730.2

(56) References Cited

U.S. PATENT DOCUMENTS

| | | | | |
|---|---|---|---|---|
| 5,553,887 A | * | 9/1996 | Karlow et al. | 280/728.3 |
| 5,564,739 A | * | 10/1996 | Davidson | 280/730.2 |
| 5,607,179 A | * | 3/1997 | Lenart et al. | 280/728.2 |
| 5,799,970 A | * | 9/1998 | Enders | 280/728.2 |
| 5,890,733 A | * | 4/1999 | Dillon | 280/728.2 |
| 6,050,636 A | | 8/2000 | Chevallier et al. | |
| 6,106,005 A | * | 8/2000 | Heinz et al. | 280/728.2 |
| 6,189,916 B1 | * | 2/2001 | Bowers et al. | 280/728.2 |
| 6,237,936 B1 | * | 5/2001 | Quade et al. | 280/728.2 |

\* cited by examiner

Primary Examiner—Brian L. Johnson
Assistant Examiner—Faye M. Fleming
(74) Attorney, Agent, or Firm—Dann, Dorfman, Herrell and Skillman, P.C.

(57) ABSTRACT

A holder for mounting an air bag module, the holder including a bottomed, substantially box-like body having a peripheral wall and an opening, the holder adapted to be fastened to a side plate of a seat back frame in a cavity of a back pad with the opening thereof facing a body of an automotive vehicle and with a bottom plate section thereof being applied to the side plate, and wrapped at the peripheral wall thereof by margin pieces which are provided around an opening portion in a side of a seat cover, rolled in the holder from the opening of the holder, and fastened to the holder, the air bag module having an air bag housed within an air bag case, the air bag module adapted to be incorporated in the holder and fastened to the side plate through the holder, whereby the air bag module is installed in the side of the seat back, the holder further including flanges, and at least first and second brittle sections serving as breaking portions, the peripheral wall including a front side wall section facing a front side of the seat back, a rear side wall section facing a rear side of the seat back, an upper side wall section, and a lower side wall section, the flanges projecting outwardly from edges of the front, rear, upper and lower side wall sections, at least a flange portion of the front side wall section having a thin metal plate embedded in an inner surface thereof, whereby the flange is reinforced by the metal plate, the first brittle section provided at a corner between the front side wall section and the upper wall section, and at a corner between the flange of the front side wall section and a flange of the upper wall section, and the second brittle section provided at a corner between the front side wall section and the lower wall section, and at a corner between the flange of the front side wall section and a flange of the lower wall section.

12 Claims, 5 Drawing Sheets

HOLDER FOR MOUNTING AN AIR BAG MODULE

BACKGROUND OF THE INVENTION

1. Field of the Invention

This invention relates to a holder for mounting an air bag module to a side of a seat back, the air bag module including an air bag case and an air bag housed within the air bag case.

2. Description of Related Art

Referring now to FIG. 1, a conventional construction for mounting an air bag module will be discussed in order to facilitate understanding of the present invention.

In a conventional automotive vehicle seat provided with an air bag, an air bag module 1 which includes an air bag case and an air bag housed within the air bag case is provided at a side of a seat back B by incorporating the air bag module 1 in a cavity (not shown) formed in a side of a back pad, and mounting the air bag module 1 to a side plate 3 of a seat back frame 2 with a lid plate portion of the air bag case being exposed to an exterior.

Referring to FIG. 2, the air bag module 1 is assembled by causing a gas-generating inflator 10 to be supported by a retainer 11, installing the inflator 10 in an interior of an air bag 12, causing the air bag 12 to be folded so as to be capable of inflating and deploying due to a gas pressure generated by the inflator 10, and causing the folded air bag to be housed within an air bag case.

The air bag case includes an outer covering member 13 and an inner plate 14. The outer covering member 13 comprises a lid plate portion 13a which is to be exposed to the outside of the side of the seat back B, a peripheral wall 13b rising from an inner surface of the lid plate portion 13a, a peripheral flange portion 13d protruding laterally from the lid plate portion 13a, and a brittle section 13c provided at an area of the inner surface of the lid plate portion 13a which is adjacent the peripheral wall 13b, the brittle section 13c corresponding to a breaking portion of the air bag case and comprising a V-shaped groove. The inner plate 14 is mounted in the peripheral wall 13b of the outer covering member 13 with a hook-like peripheral portion of the inner plate 14 being engaged with an inner flange portion of the peripheral wall 13b of the outer covering 13.

In the air bag module 1, a fastening bolt 15 of the retainer 11 installed in the interior of the air bag 12 penetrates through the air bag 12 and projects out of the air bag case through a through-hole of the inner plate 14. The air bag module 1 is fastened to the side plate 3 of the seat back frame 2 by the fastening bolt 15 and a nut.

When the air bag module is to be installed in the side of the seat back, the air bag module is preferably installed in the cavity formed in the side of the back pad, by using a box-like holder having an opening. When the holder is employed, the holder is arranged in the cavity with the opening facing a body of an automotive vehicle and margin pieces provided around an opening which is formed in a side portion of a seat cover are rolled in and fastened to the holder. Also, it is preferable not to apply to the air bag module an expanding pressure which will be generated due to deformation of the back pad when a passenger sits on the seat.

Incidentally, when the air bag module is to be installed in the side of the seat back by using the holder, the holder must be constructed so as not to prevent the air bag from inflating and deploying.

SUMMARY OF THE INVENTION

The present invention has been made in view of the foregoing requests.

It is therefore an object of the present invention to provide a holder for mounting an air bag module in a cavity formed in a side of a back pad, which can cause an air bag to be speedily inflated and developed from an air bag case.

It is another object of the present invention to provide a holder for mounting an air bag module, which is available for mounting of an air bag module while adding to the appearance of a seat back.

It is still another object of the present invention to provide a holder which can be easily applied and fastened to a side plate of a seat back frame.

In accordance with the present invention, there is provided a holder for mounting an air bag module, the holder including a bottomed, substantially box-like body having a peripheral wall and an opening, the holder adapted to be fastened to a side plate of a seat back frame in a cavity of a back pad with the opening thereof facing a body of an automotive vehicle and with a bottom plate section thereof being applied to the side plate, and wrapped at the peripheral wall thereof by margin pieces which are provided around an opening portion in a side of a seat cover, rolled in the holder from the opening of the holder, and fastened to the holder;

the air bag module including an air bag case and an air bag housed within the air bag case;

the air bag module adapted to be incorporated in the holder and fastened to the side plate through the holder, whereby the air bag module is installed in the side of the seat back;

the holder further including flange portions, and at least first and second brittle sections serving as breaking portions;

the peripheral wall comprising a front side wall section which is to be faced to a front side of the seat back, a rear side wall section which is to be faced to a rear side of the seat back, an upper side wall section, and a lower side wall section;

the flange portions projecting outwardly from edges of the front, rear, upper and lower side wall sections;

at least a flange portion of the front side wall section having a thin metal plate embedded in an inner surface thereof and mounted thereto, whereby the flange portion is reinforced by the thin metal plate;

the first brittle section provided at a corner between the front side wall section and the upper wall section, and at a corner between the flange portion of the front side wall section and a flange portion of the upper wall section; and the second brittle section provided at a corner between the front side wall section and the lower wall section, and at a corner between the flange portion of the front side wall section and a flange portion of the lower wall section.

The air bag case may include a lid plate portion having a peripheral flange portion and a peripheral portion around the opening of the seat cover may be sandwiched between the peripheral flange portion of the lid plate portion and the flange portions of the holder.

The holder may be provided with at least two vertically spaced apart hook-like fastening clips for fastening the holder to the side plate, the fastening clips rising from the bottom plate section of the holder.

The holder may be provided with a round bar-like guide pin for positioning the at least two fastening clips, the guide pin rising from a substantially middle portion of the bottom plate section between the at least two fastening clips and having a height higher than those of the at least two fastening clips.

The bottom plate section of the holder may be formed with a notch in which a mounting base of the air bag module is to be received. The side plate of the seat back frame has a rising portion which is formed by cutting a part of the side plate and raising the part of the side plate from a surface of the side plate and is to receive the mounting base of the air bag module.

BRIEF DESCRIPTION OF THE DRAWINGS

These and other objects and many of the attendant advantages of the present invention will be readily appreciated as the same become better understood by reference to the following detailed description when considered in connection with the accompanying drawings, in which like reference numerals designate the same parts throughout the Figures and wherein.

DETAILED DESCRIPTION OF THE PREFERRED EMBODIMENT

Figure 1:
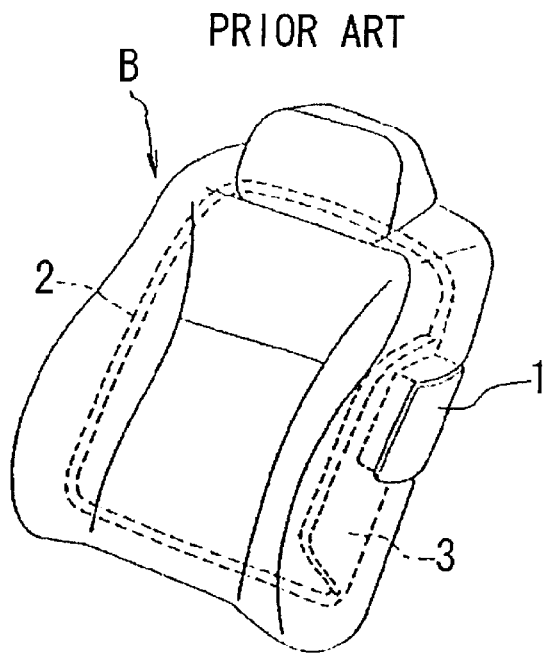
FIG. 1 is a schematic perspective view of a seat back of a conventional seat which is provided with an air bag module.
Figure 2:
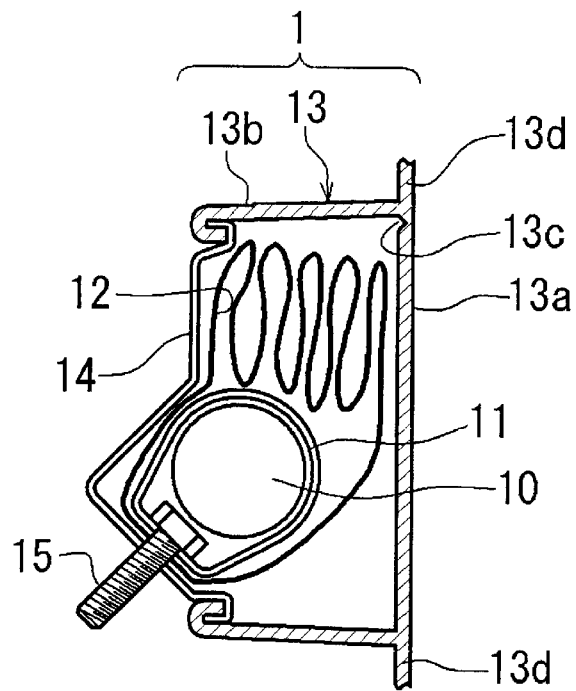
FIG. 2 is a schematic sectional view of assistance in explaining an internal construction of an air bag module.

Referring now to FIGS. 3–6, there is illustrated an embodiment of the present invention. Incidentally, in FIGS. 5 and 6, components which are substantially similar to those shown in FIGS. 1 and 2 are designated with like reference numerals.

Figure 3:
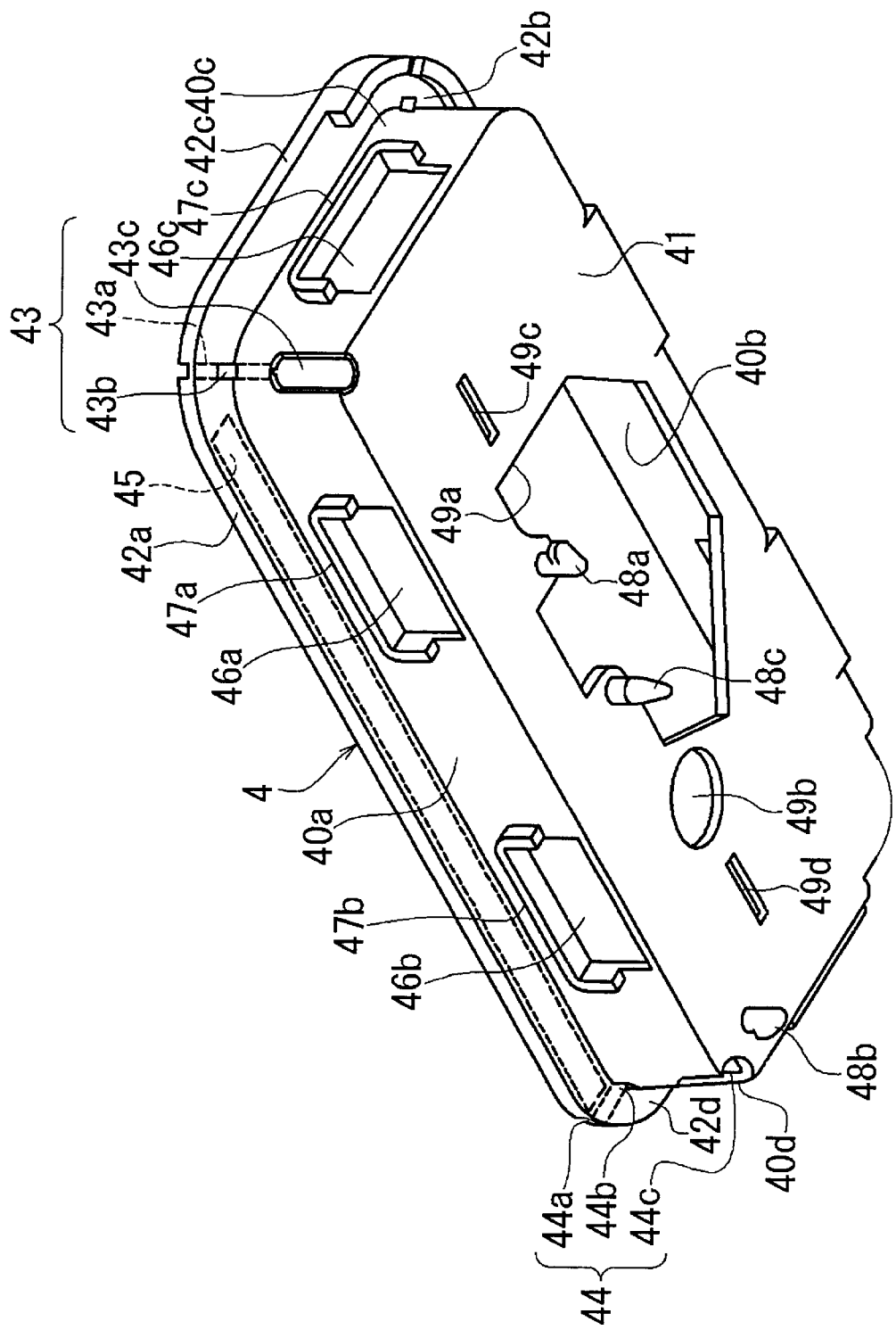
FIG. 3 is a schematic perspective view of a holder for mounting an air bag module according to an embodiment of the present invention.

FIG. 3 is a perspective view of a holder 4, as viewed from beneath a bottom of the holder 4 used for mounting an air bag module in a cavity formed in a side of a back pad (hereinafter referred to as "module holder"). The entire module holder 4 is formed from synthetic resin such as polypropylene.

The module holder 4 has a bottomed, substantially rectangular parallelepipedic box-like body comprising a bottom plate section 41 which is to be opposed to a side plate of a seat back frame, and a substantially rectangular peripheral wall rising from a surface of the bottom plate section 41. The peripheral wall comprises a front side wall section 40a which is to be faced to a front side of a seat back, a rear side wall section 40b which is to be faced to a rear side of the seat back, an upper side wall section 40c and a lower side wall section 40d which are to be faced to an upper side of the seat back and a lower side of the seat back, respectively, and flange portions 42a, 42b, 42c, 42d protruding outward from an open end of the rectangular peripheral wall or protruding outward from edges of the front, rear, upper and lower wall sections 40a–40d.

The module holder 4 has at least first and second brittle sections 43, 44 which are provided at two corners of the peripheral wall and at two corners of flange portions and serve as breaking portions. More particularly, the first brittle section 43 is provided at a corner between the front side wall section 40a, which is to be faced to the front side of the seat back, and the upper wall section 40c, and at a corner between the flange portion 42a and the flange portion 42c. The second brittle section 44 is provided at a corner between the front side wall section 40a and the lower wall section 40d, and at a corner between the flange portion 42a and the flange portion 42d.

The first brittle section 43 comprises a groove 43a vertically extending from the corner between the flange portion 42a and the flange portion 42c to the corner between the front side wall section 40a and the upper wall section 40c, a through-hole 43b formed in a portion of the corner between the front side wall section 40a and the upper wall section 40c which is adjacent the open end of the peripheral wall, and an elongated hole 43c vertically extending from a middle portion of the corner between the front side wall section 40a and the upper wall section 40c to the bottom plate section 41. The groove 43a vertically extends from the corner between the flange portion 42a and the flange portion 42c to the corner between the front side wall section 40a and the upper wall section 40c as discussed above, so that thickness of the corner between the flange portion 42a and the flange portion 42c and thickness of the corner between the front wall section 40a and the upper wall section 40c are reduced.

The second brittle section 44 comprises a groove 44a vertically extending from the corner between the flange portion 42a and the flange portion 42d to the corner between the front side wall section 40a and the lower wall section 40d, a through-hole 44b formed in a portion of the corner between the front side wall section 40a and the lower wall section 40d which is adjacent the open end of the peripheral wall, and an elongated hole 44c vertically extending from a middle portion of the corner between the front side wall section 40a and the lower wall section 40d to the bottom plate section 41. The groove 43a vertically extends from the corner between the flange portion 42a and the flange portion 42d to the corner between the front side wall section 40a and the lower wall section 40d, so that thickness of the corner between the flange portion 42a and the flange portion 42d and thickness of the corner between the front wall section 40a and the lower wall section 40d are reduced.

In addition to the first and second brittle sections 43, 44, brittle sections constructed in the same manner as the first and second brittle sections 43, 44 are done may be provided at a corner between the rear side wall section 40b, which is to be faced to the rear side of the seat back, and the upper side wall section 40c, at a corner between the flange portion 42c and the flange portion 42b, at a corner between the rear side wall section 40b and the lower side wall section 40d, and at a corner between the flange portion 42b and the flange portion 42d.

In the module holder 4, a thin metal plate 45 is embedded in and mounted to the protruding flange portion 42a which is to be faced to the front side of the seat back, whereby the protruding flange portion 42a is reinforced by the thin metal plate 45. The same thin metal plates may be embedded in and mounted to the upper and lower protruding flange portions 42c, 42d and the protruding flange portion 42b which is faced to the rear side of the seat back.

The module holder 4 is formed with fastening holes which are to be used for attaching margin pieces provided around an opening formed in a side of a seat cover as will be discussed hereinafter. More particularly, a pair of fastening holes 46a, 46b are formed in each of the front and rear side wall sections 40a, 40b (only the fastening holes 46a, 46b in the front side wall section 40a are shown), and a fastening hole 46c is formed in each of the upper and lower side walls 40c, 40d (only the fastening hole 46c in the upper side wall 40c is shown). The fastening holes 46a, 46b, 46c are reinforced by margin ribs 47a, 47b, 47c which are provided at edge areas of the fastening holes 46a, 46b, 46c, which are adjacent the protruding flange portions 42a, 42b, 42c, 40d, so as to extend along the edge areas to both edge areas of the fastening holes 46a, 46b, 46c.

The bottom plate section 41 of the module holder 4 is provided with at least two hook-like clips 48a, 48b which are vertically spaced apart from each other and hang down from the bottom plate section 41. Also, a round bar-like guide pin 48c having a height higher than those of the hook-like clips 48a, 48b is provided at a substantially middle area of the bottom plate section 41 between the spaced apart hook-like clips 48a, 48b. Furthermore, the bottom plate section 41 is formed with a notch 49a in which a mounting base of an inner plate of an air bag case is to be received, a through-hole 49b which a harness of an inflator is to be penetrated, and through-holes 49c, 49d formed by positioning projections of a mold for forming the module holder.

Figure 4:
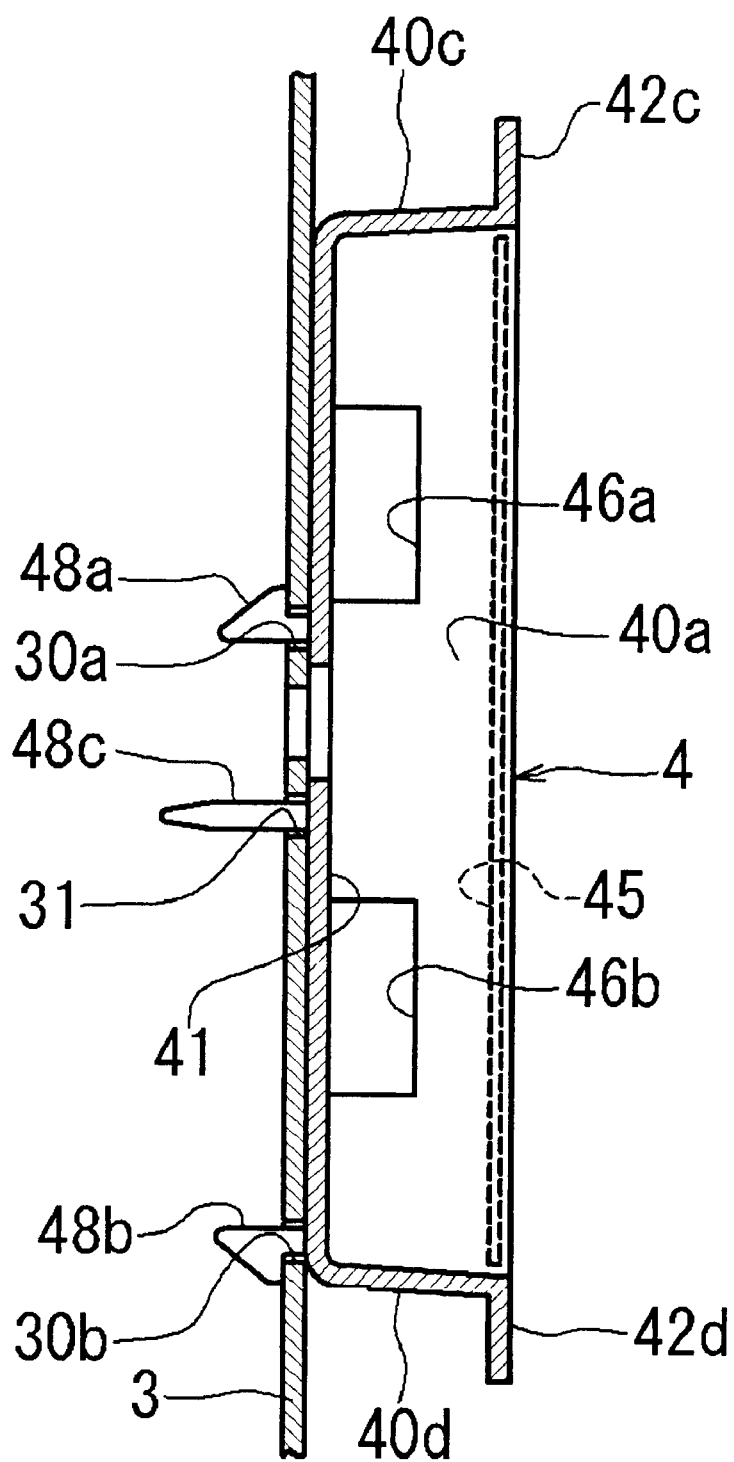
FIG. 4 is a schematic sectional view of the holder attached to a side plate of a seat back frame.

Referring to FIG. 4, the module holder 4 constructed as discussed above can be applied and fastened to a side plate 3 of the seat back frame (not shown) by causing the clips 48a, 48b to be press-fitted in fastening holes 30a, 30b formed in the side plate 3, prior to installing of the air bag module. When the clips 48a, 48b are to be press-fitted in the fastening holes 30a, 30b, the guide pin 48c having a height higher than those of the clips 48a, 48b is first mounted in a through-hole 31 of the side plate 3 and then the clips 48a, 48b are press-fitted in the fastening holes 30a, 30b. Therefore, the press-fitting of the clips 48a, 48b in the fastening holes 30a, 30b can be carried out while causing the clips 48a, 48b to be easily aligned with the fastening holes 30a, 30b.

Figure 5:
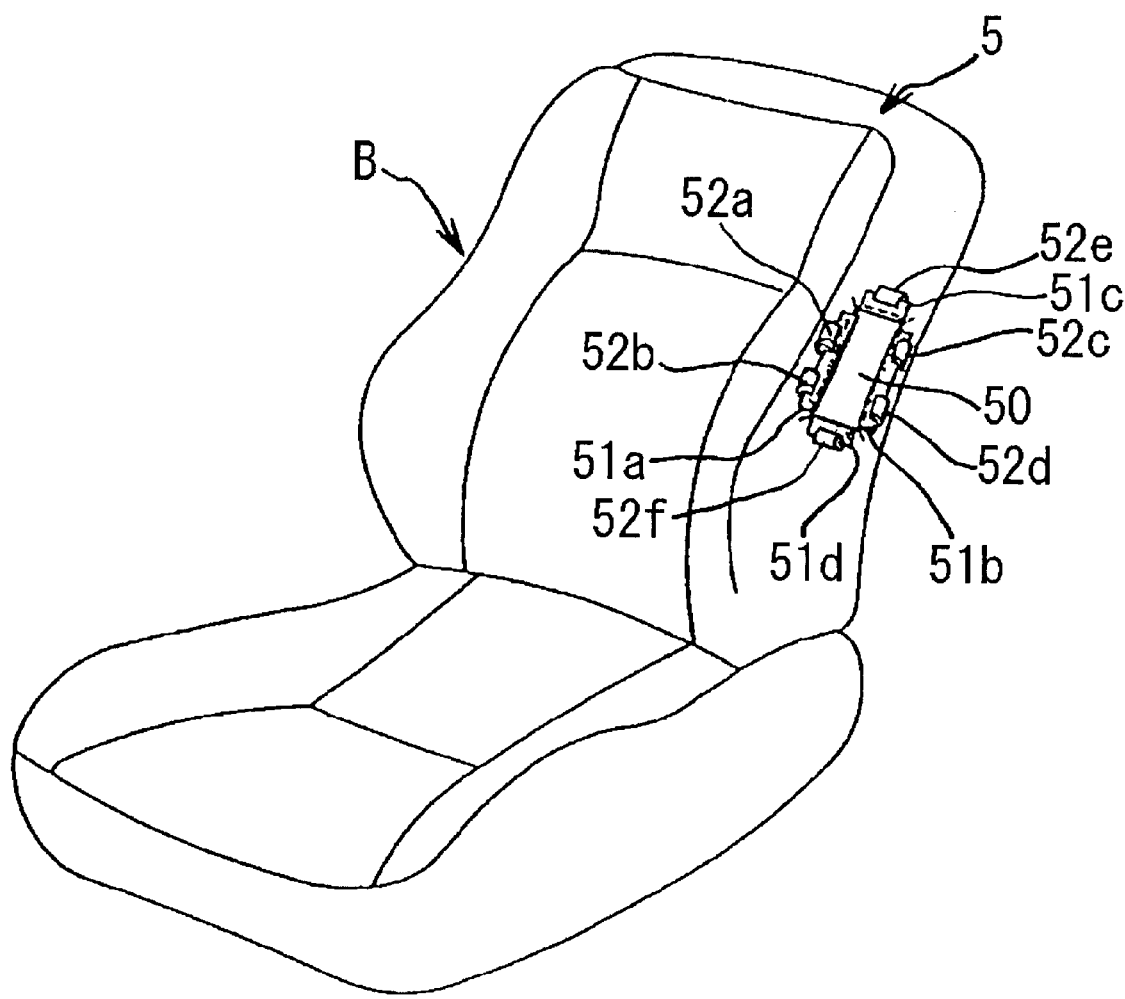
FIG. 5 is a schematic perspective view of a seat in which the holder is to be employed.

Referring now to FIG. 5, a seat back B has a seat cover 5, a part of which positionally corresponds to a side of the seat back B is formed with an opening portion 50 corresponding to the module holder 4 in size and shape. Provided around an edge of the opening portion 50 are margin pieces 51a, 51b, 51c, 51d by which the wall sections 40a, 40b, 40c, 40d of the module holder 4 are to be wrapped, and at terminals of which trim cords (not shown) having hooks 52a, 52b, 52c, 52d, 52e, 52f are provided.

Figure 6:
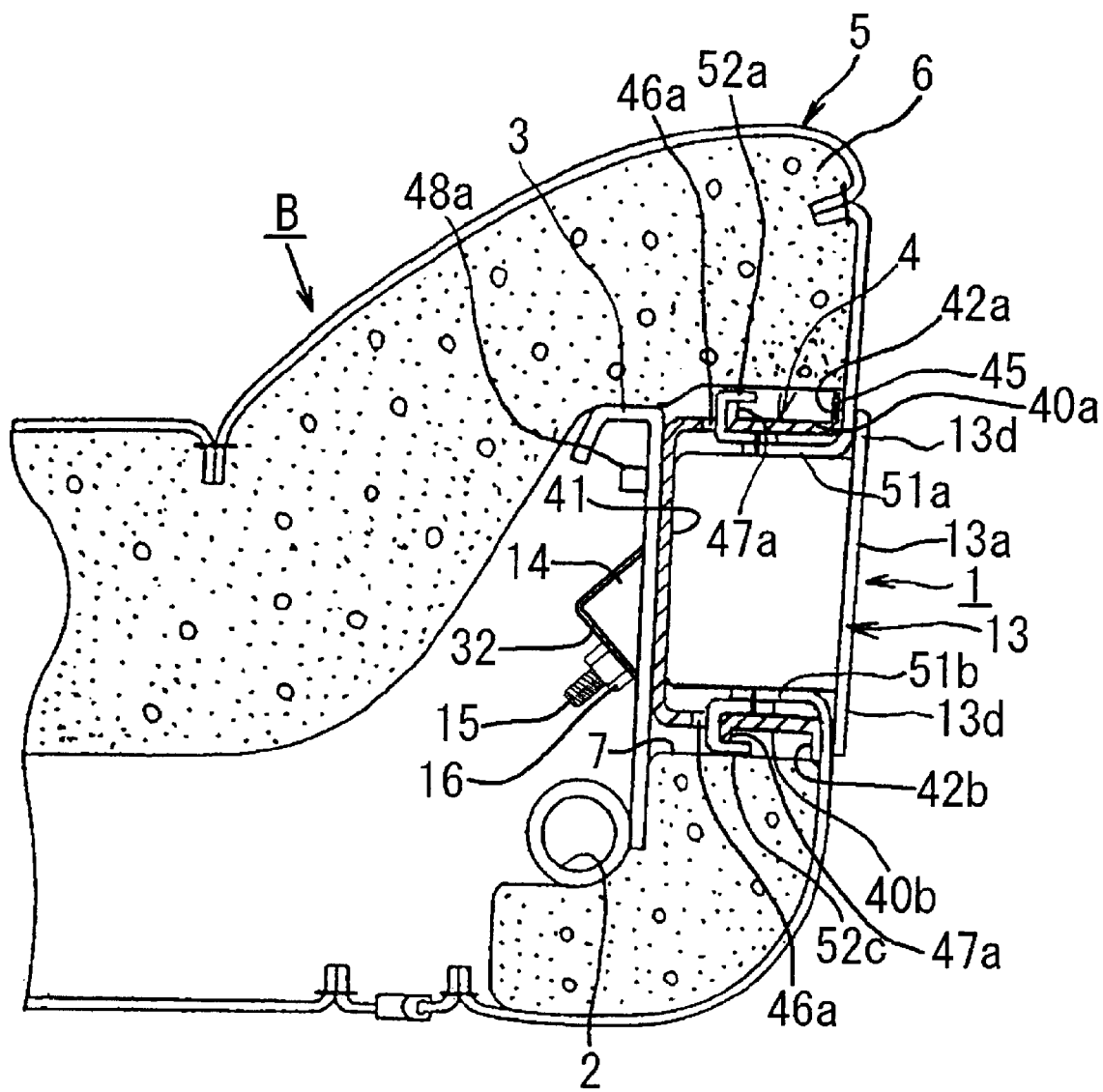
FIG. 6 is a schematic sectional view of a seat back in which the air bag module is incorporated by using the holder.

Referring to FIG. 6, the module holder 4 is received into a cavity 7, formed in a side of a back pad 6, from the opening portion 50 of the seat cover 5, and is applied and secured to the side plate 3 of the seat back frame 2. After the module holder 4 is secured to the side plate 3, the margin pieces 51a, 51b, 51c, 51d are rolled around the wall sections 40a, 40b, 40c, 40d of the module holder 4, a portion of the seat cover 5 around the opening portion 50 of the seat cover 5 is received by the protruding flange portions 42a, 42b, 42c, 42d of the module holder 4, and the hooks 52a–52f are hooked in the fastening holes 46a, 46b, 46c of the module holder 4, whereby the margin pieces 51a–51d can be secured to the wall sections 40a, 40b, 40c, 40d of the module holder 4.

At least the protruding flange portion 42a which is faced to the front side of the seat back is reinforced by the thin metal plate 45 embedded in the flange portion 42a and the margin ribs 47a, 47b, 47c are provided around the fastening holes 46a, 46b, 46c as discussed above, so that the opening portion 50 of the seat cover 5 can be kept steadily opened by causing the hooks 52a–52f to be engaged with the margin ribs 47a, 47b, 47c.

After the margin pieces 51a, 51b, 51c, 51d of the seat cover 5 are attached to the module holder 4, the air bag module 1 is assembled in an interior of the module holder 4 and can be secured together with the module holder 4 to the side plate 3 of the seat back frame 2 by a nut 16 and a fastening bolt 15 projecting from an inner plate 14 of the air bag module 1.

In the illustrated example, the air bag module 1 is constructed in the same manner as the air bag module of FIG. 2 is done. The air bag module 1 is received in the module holder 4 with a lid plate portion 13a being exposed to the exterior. The air bag module 1 is fastened to the side plate 3 of the seat back frame 2 by the fastening bolt 15 and the nut 16 with a mounting base of the inner plate 14 thereof being received and supported by a rising portion 32 of the side plate 3 which is formed by cutting a part of the side plate 3 and raising the part of the side plate 3 from a surface of the side plate 3, so that the air bag module 1 can be steadily mounted to the side plate 3. Also, the periphery of the opening portion 50 of the seat cover 5 is sandwiched between the protruding flange portions 42a, 42b, 42c, 40d of the module holder 4 and a peripheral flange portion 13d protruding from the lid plate portion 13a, thus adding to the appearance of the seat back and preventing any foreign materials from entering the seat back B.

In the construction for mounting the air bag module 1 by utilizing the module holder 4, an inflating pressure of the air bag is applied to a brittle section 13c (see FIG. 2) of the air bag module 1 which corresponds to the breaking portion, whereby the brittle section 13c is torn, the lid plate portion 13a is operatively opened, and a portion of the peripheral wall 13b of the air bag module 1 is collapsed forwardly. The inflating pressure of the air bag is also applied to the brittle sections 43, 44 of the module holder 4, whereby the module holder 4 is broken.

The flange portion 42a of the module holder 4 is reinforced by the thin metal plate 45 embedded in the inner surface of the flange portion 42a as discussed above, so that even if an inflating pressure of the air bag is applied to the flange portion 42a, the flange portion 42a can withstand the inflating pressure without deforming. Therefore, the inflating pressure of the air bag can be efficiently applied to the brittle sections 43, 44 of the module holder 4 without losses of the inflating pressure, so that the air bag can be speedily inflated and deployed.

As discussed above, in the module holder according to the present invention, the flange portions are projected outwardly from the open end of the module holder, the brittle sections corresponding to the breaking portions of the module holder are provided at least the both corners of the flange portion facing the front side of the seat back and the both corners of the front side wall section facing the front side of the seat back, and at least the flange portion of the front wall section is reinforced by the thin metal plate embedded in the flange portion of the front wall section, so that an inflating pressure of the air bag can be efficiently applied to the brittle sections of the module holder without losses of the inflating pressure, and the air bag can be speedily inflated and deployed.

Also, in the module holder according to the present invention, the margin pieces provided around the opening portion of the seat cover which is formed in the side of the seat cover are rolled in the module holder and fastened to the peripheral wall of the module holder and the periphery around the opening of the seat cover is sandwiched between the flange portions of the module holder and the peripheral flange portion of the air bag module, thus adding to the appearance of the seat back, improving the value of the seat, and preventing any foreign materials from entering the seat back.

Further, in the module holder according to the present invention, the at least two vertically spaced apart hook-like clips serving as means to fasten the module holder to the side plate of the seat back frame are provided on and rise from the bottom plate of the module holder, so that prior to installing of the air bag module, the module holder can be applied to and easily secured to the side plate of the seat back frame.

Also, the round bar-like guide pin having a height higher than those of the spaced apart hook-like clips is provided at the substantially middle portion of the bottom plate of the module holder between the hook-like clips for positioning the hook-like clips, so that when the module holder is to be secured to the side plate of the seat back frame, the press-fitting of the clips into the fastening holes of the side plate can be easily performed while positioning the hook-like clips by the guide pin having the height higher than those of the hook-like clips.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A holder for mounting an air bag module, said holder including a bottomed, substantially box-like body having a peripheral wall and an opening, said holder adapted to be fastened to a side plate of a seat back frame in a cavity of a back pad with said opening thereof facing a body of an automotive vehicle and with a bottom plate section thereof being applied to said side plate, and wrapped at said peripheral wall thereof by margin pieces which are provided around an opening portion in a side of a seat cover, rolled in said holder from said opening of said holder, and fastened to said holder;

said air bag module including an air bag case and an air bag housed within said air bag case;

said air bag module adapted to be incorporated in said holder and fastened to said side plate through said holder, whereby said air bag module is installed in the side of the seat back;

said holder further including flange portions, and at least first and second brittle sections serving as breaking portions;

said peripheral wall comprising a front side wall section which is to be faced to a front side of said seat back, a rear side wall section which is to be faced to a rear side of said seat back, an upper side wall section, and a lower side wall section;

said flange portions projecting outwardly from edges of said front, rear, upper and lower side wall sections;

at least a flange portion of said front side wall section having a thin metal plate embedded in an inner surface thereof and mounted thereto, whereby said flange portion is reinforced by said thin metal plate;

said first brittle section provided at a corner between said front side wall section and said upper wall section, and at a corner between said flange portion of said front side wall section and a flange portion of said upper wall section; and said second brittle section provided at a corner between said front side wall section and said lower wall section, and at a corner between said flange portion of said front side wall section and a flange portion of said lower wall section.

2. A holder for mounting an air bag module, as defined in claim 1, wherein said air bag case includes a lid plate portion having a peripheral flange portion, and wherein a peripheral portion around said opening of said seat cover is sandwiched between said peripheral flange portion of said lid plate portion and said flange portions of said holder.

3. A holder for mounting an air bag module, as defined in claim 1, wherein said holder is provided with at least two vertically spaced apart hooked fastening clips for fastening said holder to said side plate, said fastening clips rising from said bottom plate section of said holder.

4. A holder for mounting an air bag module, as defined in claim 2, wherein said holder is provided with at least two vertically spaced apart hooked fastening clips for fastening said holder to said side plate, said fastening clips rising from said bottom plate section of said holder.

5. A holder for mounting an air bag module, as defined in claim 3, wherein said holder is provided with a round guide pin for positioning said at least two fastening clips, said guide pin rising from a substantially middle portion of said bottom plate section between said at least two fastening clips and having a height higher than those of said at least two fastening clips.

6. A holder for mounting an air bag module, as defined in claim 4, wherein said holder is provided with a round guide pin for positioning said at least two fastening clips, said guide pin rising from a substantially middle portion of said bottom plate section between said at least two fastening clips and having a height higher than those of said at least two fastening clips.

7. A holder for mounting an air bag module, as defined in claim 1, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

8. A holder for mounting an air bag module, as defined in claim 2, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

9. A holder for mounting an air bag module, as defined in claim 3, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

10. A holder for mounting an air bag module, as defined in claim 4, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

11. A holder for mounting an air bag module, as defined in claim 5, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

12. A holder for mounting an air bag module, as defined in claim 6, wherein said bottom plate section of the holder is formed with a notch in which a mounting base of said air bag module is to be received and wherein said side plate of said seat back frame has a rising portion which is formed by cutting a part of said side plate and raising said part of the side plate from a surface of said side plate, and is to receive said mounting base of said air bag module.

\* \* \* \* \*